C. E. ROOT.
MANURE SPREADER.
APPLICATION FILED JULY 29, 1914.

1,173,037.

Patented Feb. 22, 1916.
3 SHEETS—SHEET 1.

Witnesses
C. E. Boteler
Wm. S. Fowler.

Inventor
C. E. Root.
By ... Attorney

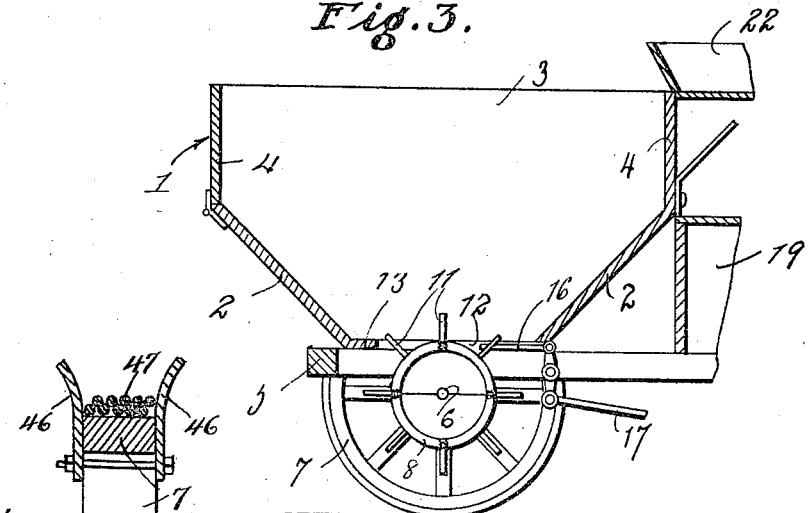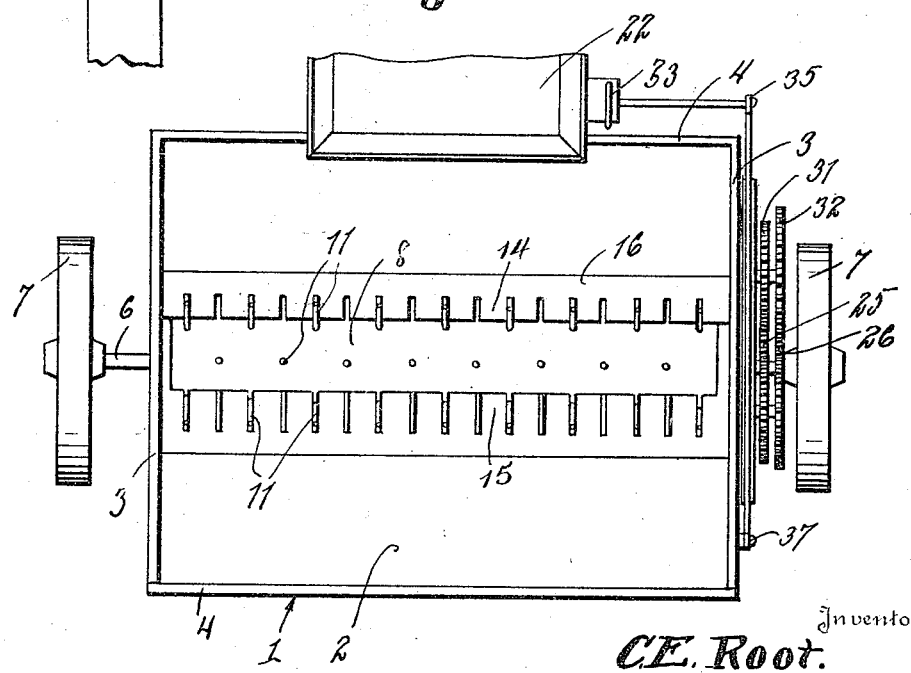

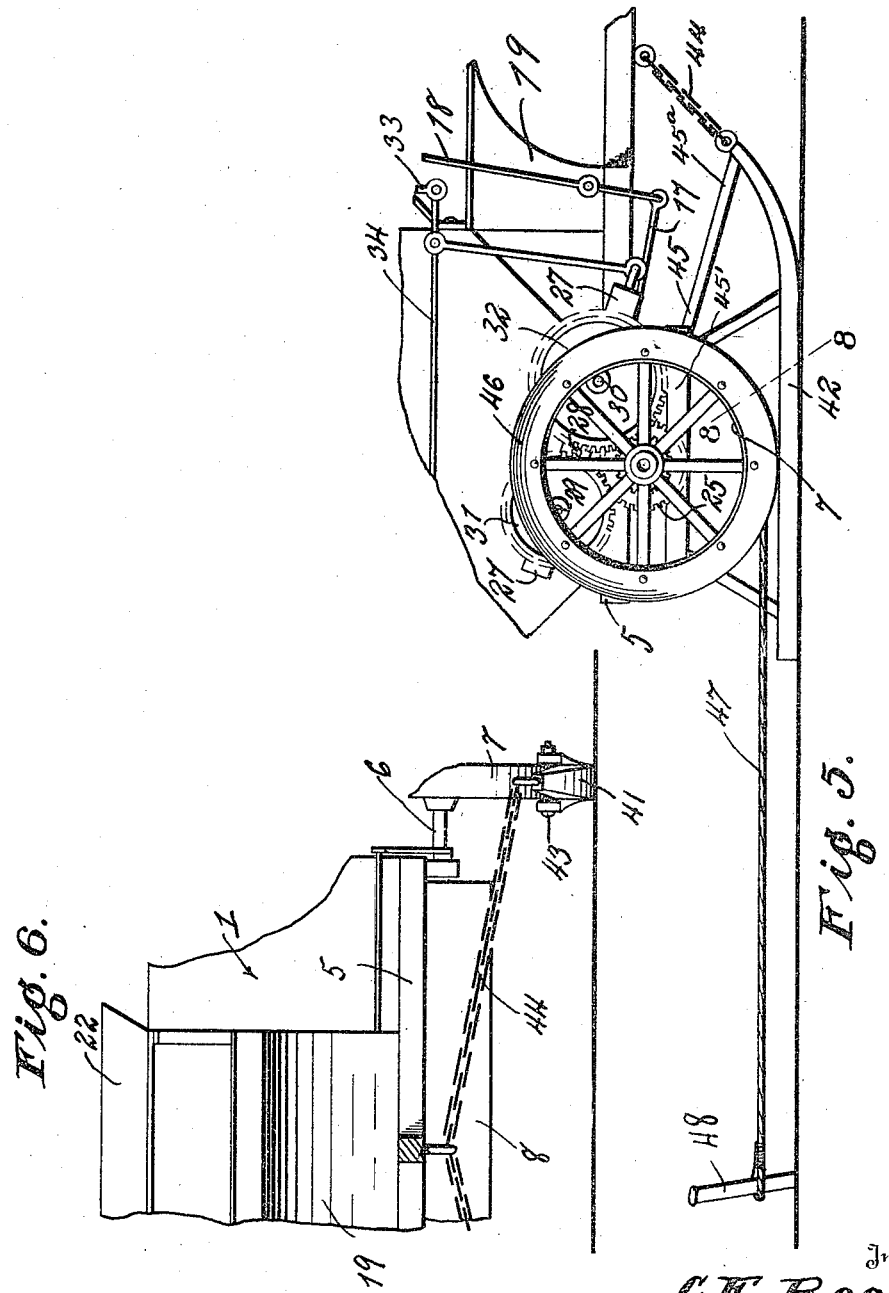

UNITED STATES PATENT OFFICE.

CLAUDE E. ROOT, OF CAMBRIDGE SPRINGS, PENNSYLVANIA.

MANURE-SPREADER.

1,173,037.  Specification of Letters Patent.  Patented Feb. 22, 1916.

Application filed July 25, 1914. Serial No. 853,836.

*To all whom it may concern:*

Be it known that I, CLAUDE E. ROOT, a citizen of the United States, residing at Cambridge Springs, in the county of Crawford and State of Pennsylvania, have invented certain new and useful Improvements in Manure-Spreaders, of which the following is a specification.

This invention comprehends certain new and useful improvements in manure spreaders and has for its primary object to provide a device of this character which will be of extremely simple construction and operation as well as highly efficient in use.

Another object is to provide a device of this character including a hopper body with a distributing toothed drum mounted in the bottom thereof upon the axle carrying the ground wheels, and means for rotating the drum at various rates of speed to cause the teeth of said drum to coact with the teeth on the adjacent edges of the hopper body to pulverize and distribute manure from said body as the latter is drawn over the ground.

Another object of the invention is to provide a spreader of this character which will be constructed in such manner that the quantity of material to be distributed may be regulated by the position of the valve plates which may be moved by means of a lever within reach of the operator or driver of the spreader.

A further object of the invention is to provide a spreader of this character in which the distributing drum may be secured upon the axle or removed and replaced by dumping plates, when desired.

A further object of the invention is to provide a spreader of this character which will be constructed in such manner that runners may be readily attached and a cable secured to one of the ground wheels to rotate the latter and cause rotation of the drum as the spreader is moved over the surface.

The invention has for a still further object to provide improved and novel means for changing the speed of rotation of the drum independently of the speed of rotation of the ground wheels and discontinuing rotation of the drum during rotation of the ground wheels, when desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
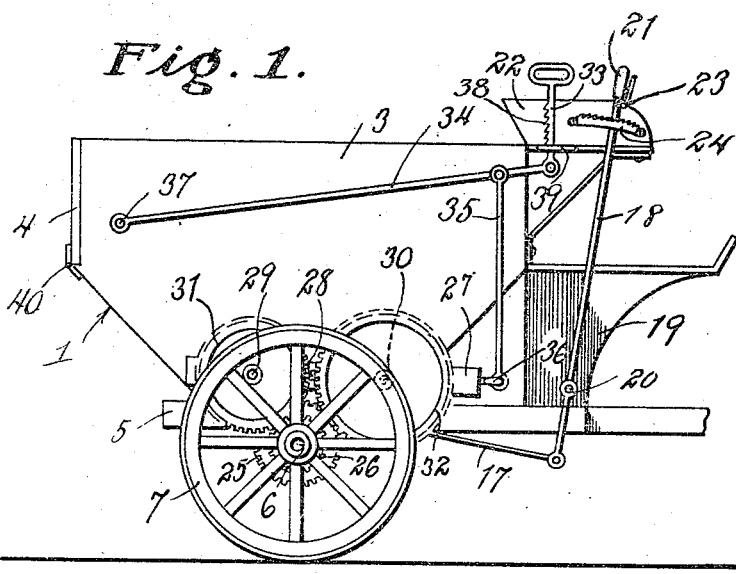
Figure 2:
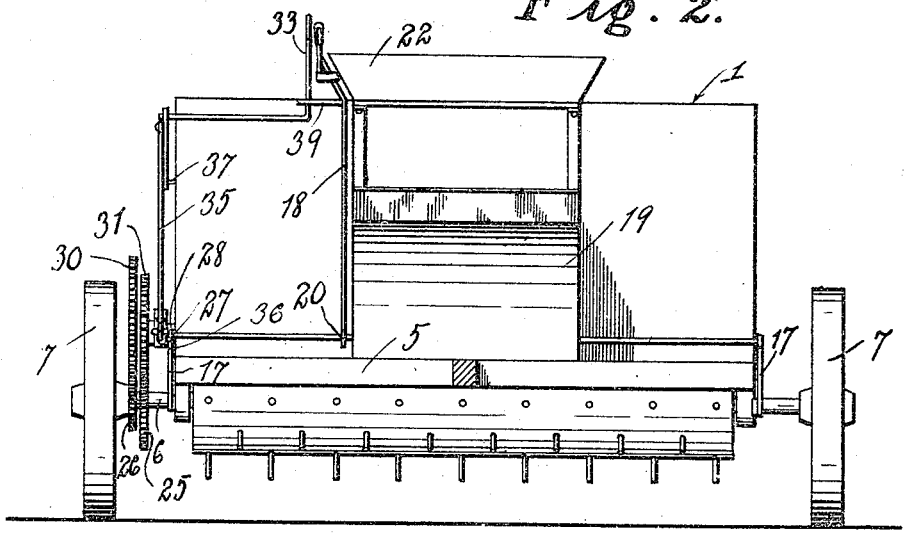
Figure 7:
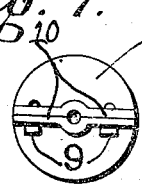

Figure 1 is a side elevation of my improved form of spreader, Fig. 2 is a front elevation thereof, Fig. 3 is a longitudinal section through the spreader, Fig. 4 is a fragmentary top plan view, Fig. 5 is a side elevation, with the runner secured in position and the ground wheel rotating means connected with the driving ground wheel to rotate the latter, Fig. 6 is a fragmentary front elevation of the device with the runners mounted thereon, Fig. 7 is a detail end view of the sectional drum, and Fig. 8 is a section on the line 8—8 of Fig. 5.

Referring in detail to the drawings by numerals, 1 designates the body of the spreader which is in the form of a hopper having inclined front and lower walls 2 and straight sides 3 with the upper portions of the front and rear walls extended in a substantially vertical direction, as shown at 4. It will be understood that the body 1 is mounted upon the supporting frame 5 and that the axle 6 is mounted transversely beneath the supporting frame 5, and has the ground wheels 7 loosely mounted upon its opposite ends.

Removably mounted upon the axle 6 is the sectional drum 8 formed preferably in halves, thereby providing a longitudinally split drum which may be readily secured in position upon the axle 6 by means of the clamp bolts 9 engaged through the ears 10 projecting from the opposite ends of the halves of said drum. The drum 8 is provided with a plurality of rows of teeth 11 projecting radially from the same and working through the transverse opening 12 in the bottom 13 of the body 1 and engaged between the rows of teeth 14 and 15 projecting into said opening from the rear edge of the opening 12 and the rear edge of the valve plate 16 forming the opposite wall of said opening and serving to regulate the width of the same.

The valve plate 16 is adapted to be adjusted by means of the rod 17 having one end connected with said valve plate 16, while its opposite end is connected with the lower end of the lever 18, which is fulcrumed to the footrest support 19 or other suitable stationary portion of the device, as shown at 20, adjacent the lower end of said lever 18. The upper or handle end 21 of the lever 18 is positioned adjacent the seat 22 and the lever is adapted to be locked in adjusted position by the latch member 23 secured to said lever adjacent the upper end thereof and adapted for engagement with the segment rack 24, as will be readily understood by referring to the drawings.

The axle 6 has a relatively large gear 25 keyed thereon and a relatively small gear 26 is carried by the hub of one of the wheels 7 for rotation synchronously with the rotation of the wheel. A rocker arm 27 is pivotally mounted upon a pin 28 which projects outwardly from the side 3 of the bed 1. The pin 28 extends through the transverse center of the rocker bar or arm, and stub shafts 29 and 30 are rotatably carried by the rocker arms, equal distances upon the opposite sides of the pivot pin 28. A pair of gears 31 are keyed upon the stub shaft 29. One of the gears 31 is smaller in diameter than the other and is adapted for meshing with the gear 25, while the larger of the pair of gears is meshing with the gear 26. A pair of gears 32 are keyed upon the stub shaft 30 and they are also of different diameters so that they will properly mesh with the gears 25 and 26 for rotating the axle 6 by the rotation of the ground wheel 7, which has the gear 26 associated therewith. The pair of gears 32 are correspondingly of greater diameter than the pair of gears 31 for driving the axle 6 at a slower rate of speed than it will be driven by the gear 31. When it is desired to drive the axle 6 and the drum carried thereby at a higher speed, the rocker arm 27 is rocked for moving the gears 31 into meshing engagement with the gears 25 and 22, and when the slower rotation of the drum is desired the rocker arm is rocked to move the gears 32 into engagement with the gears 25 and 26, which movement of the arm will move the gears 31 out of mesh with the gears 25 and 26. When the rocker arm 27 is in its normal or neutral position, both pairs of gears 32 and 31 are out of mesh with the gears 25 and 26, which permits the wheel 7 to rotate independent of the axle 6. A lever 33 is supported for vertical movement alongside the seat 22 and it has its lower end pivotally connected to a rod 34. The rod 34 extends along the outer surface of the side 3 and has its end remote from the end to which the lever 33 is connected, pivotally connected to the side 3 as is shown at 37. A vertically positioned rod 35 is pivotally connected to the rod 34 intermediate its ends for vertical movement upon swinging or pivotal movement of the rod 34 by vertical movement of the lever 33. The lower end of the rod 35 is loosely connected to one end of the rocker bar 27 for locking the bar upon vertical movement of the rod 35. The lever 33 has teeth 38 formed upon one of its edges for coaction with a rack 39 for holding the lever in different positions as desired.

Owing to the fact that the upwardly directed or vertical upper portion 4 of the rear end of the body 1 is hingedly connected to the inclined lower portion thereof, as shown at 40, this portion may be swung downwardly during operation of filling the body 1 with the material to be distributed, thereby making it unnecessary to raise all of the material to the top of the body 1 before depositing said material in said body. It will further be understood that the portion 4 of the rear end of the body 1 may be secured in closed position in any suitable and well known manner.

In order that the device may be readily operated upon a snow or ice-covered surface, I have provided a pair of runners 41 and 42 constructed in such manner that the runner 41 may be readily positioned beneath one of the ground wheels 7 secured to the same by means of the pivot bolts 43 engaged through said runner 41 and said wheel 7, the front of the runner 41 being connected with the front of the runner 42 by means of the connecting chain 44. The runner 42 is of such construction that it may be readily secured beneath the frame 5 adjacent the remaining ground wheel 7, which will hereinafter be referred to as the propelling ground wheel as shown at 45. The structure 45 supports the axle 6 and hold the propelling ground wheel 7 out of engagement with the ground and permits it to rotate clear of the runner. The supporting structure 45 is the ordinary construction employed for attaching runners to vehicle bodies and includes an axle supporting bar 45' which is connected to the runner 42 by suitable braces 45ª. The propelling ground wheel 7 is provided in this form of the device, with a pair of side flanges 46 between which is wound a cable 47, which has one end secured to the propelling wheel 7, while the opposite end of said cable may be secured to a stake 48 to be driven in the surface a spaced distance from the wheel 7, whereby, as the device moves over the surface, the cable 47 will be caused to unwind from the wheel 7, thereby compelling said wheel 7 to rotate and drive the axle 6 and drum 8 through the pair of drive gears 31 or 32, as the case may be. The runners 41 and 42 and the cable 47 are clearly shown in Figs. 5 and 6.

While the preferred embodiment of the invention, is shown and described, it will be understood that minor changes in the details of construction and arrangement of parts may be made within the scope of the appended claims without departing from the spirit of the invention or sacrificing any of the advantages thereof.

What is claimed is:—

1. A device of the class described comprising a body, a frame for supporting said body, an axle beneath said frame ground wheels carried by said axle, a gear carried by one of said ground wheels, a gear carried by said axle, a distributing member carried by said axle and adapted for rotation with the latter, said body being provided with an opening above the distributing member, and means for transmitting rotary motion from the gear carried by one of the ground wheels to the gear carried by the axle.

2. A device of the class described comprising a frame, a body carried by said frame and having an open portion, an axle beneath said frame, a distributing member carried by said axle and projecting into the open portion of the body, a gear wheel carried by said axle, ground wheels loosely mounted upon said axle, a gear wheel carried by one of said ground wheels, a rock arm, means for pivotally mounting said rock arm upon said body, spaced transmission gears carried by said rock arm on opposite sides of the pivot point of said rock arm, and means for operating the rock arm to bring the transmission gears thereof into engagement with the gears carried by the axle and ground wheel to cause rotation of said axle and distributing member.

3. A device of the class described comprising a body, a frame beneath said body, an axle mounted beneath said frame, ground wheels loosely mounted upon said axle, a runner secured beneath one of said ground wheels, a second runner secured beneath the body, said second runner being spaced from the second ground wheel, a distributing member carried by said axle, said body having an outlet opening above said distributing member, means for rotating the second ground wheel, and operative connections between the second ground wheel and the axle, whereby said axle and distributing member will be rotated upon rotation of the second ground wheel.

In testimony whereof I affix my signature in presence of two witnesses.

CLAUDE E. ROOT.

Witnesses:
  J. PERRY ECKELS,
  ELLERY F. STETSON.